United States Patent [19]

Pfefferle

[11] Patent Number: 4,811,707
[45] Date of Patent: Mar. 14, 1989

[54] METHOD OF OPERATING CATALYTIC IGNITION ENGINES AND APPARATUS THEREFOR

[76] Inventor: William C. Pfefferle, 51 Woodland Dr., Middletown, N.J. 07748

[21] Appl. No.: 895,468

[22] Filed: Dec. 8, 1986

Related U.S. Application Data

[60] Division of Ser. No. 526,530, Aug. 26, 1983, Pat. No. 4,646,707, which is a continuation-in-part of Ser. No. 249,075, Mar. 30, 1981, abandoned.

[51] Int. Cl.⁴ ............................................. F02B 51/02
[52] U.S. Cl. ...................................... 123/272; 123/670
[58] Field of Search ........... 123/193 R, 193 C, 193 P, 123/193 H, 657, 668, 669, 670, 272, 143 B, 252; 92/212, 224, 248

[56] References Cited

U.S. PATENT DOCUMENTS

| | | | |
|---|---|---|---|
| 2,914,048 | 11/1959 | Philipp | 123/668 |
| 2,978,360 | 4/1961 | Bradstreet | 123/669 |
| 3,855,986 | 12/1974 | Wiss | 123/668 |
| 3,911,891 | 10/1975 | Dowell | 123/669 |
| 3,923,011 | 12/1975 | Pfefferle | 123/143 B |
| 3,982,910 | 9/1976 | Houseman et al. | 123/3 |
| 4,011,839 | 3/1977 | Pfefferle | 123/143 B |
| 4,425,884 | 1/1984 | Thring et al. | 123/272 |
| 4,530,341 | 7/1985 | Palm | 123/668 |
| 4,577,611 | 3/1986 | Hagino | 123/193 P |
| 4,646,707 | 3/1987 | Pfefferle | 123/298 |

Primary Examiner—David A. Okonsky
Attorney, Agent, or Firm—Kane, Dalsimer, Sullivan, Kurucz, Levy, Eisele and Richard

[57] ABSTRACT

Disclosed is a method of operating a catalytic ignition internal combustion engine wherein the fuel is injected into a combustion chamber at a time near maximum compression such that at least a part of the fuel impinges upon an oxidation catalyst surface comprising a portion of the wall of said combustion chamber, said catalytic surface being insulated from the surroundings external to the combustion chamber by a low thermal conductivity material, said catalytic surface preferably comprising platinum. Also disclosed are combustion chambers constructed specially for the use of this method and the methods of constructing them.

3 Claims, 1 Drawing Sheet

METHOD OF OPERATING CATALYTIC IGNITION ENGINES AND APPARATUS THEREFOR

RELATED APPLICATION

This application is a division of U.S. patent application Ser. No. 526,530 filed Aug. 26, 1983, now issued as U.S. Pat. 4,646,707 and which in turn was a continuation-in-part of my copending application, Ser. No. 249,075, filed Mar. 30, 1981 and now abandoned.

STATEMENT OF THE INVENTION

This invention relates to a method of operating cyclic fuel injected engines wherein fuel is injected into compressed air in a combustion chamber and into contact with a hot catalytic surface, such contact serving to vaporize and to ignite said fuel and to minimize formation of soot.

More specifically, this invention relates to a method of operating a catalytic ignition engine which comprises injecting fuel into compressed air in a combustion chamber whose inner walls comprise chamber sides, a chamber head and the crown of a piston means, said chamber walls having at least 15% of their surface covered with a firmly affixed ceramic thermal insulation at least one mil thick, said insulation having a melting point of at least 3500° F., at least 15% of said chamber walls having a catalyst for fuel oxidation, said catalyst being resident on said thermal insulation, said catalyst comprising a noble metal or base metal oxide oxidation catalyst, said injection being carried out such that at least a part of said fuel impinges on said catalyst at about the point of maximum compression when the surface of said catalyst is hot, thereby effecting very rapid ignition and substantially complete combustion of said fuel.

More specifically also, it relates to a catalytic ignition engine having such a chamber and to the method of constructing such chambers.

BACKGROUND OF THE INVENTION

Existing cyclic fuel injected engines, i.e. compression ignition engines as represented by diesel engines, achieve a significantly higher thermal efficiency than spark ignition engines in automotive use and acceptable levels of carbon monoxide and light hydrocarbons. However, soot and nitrogen oxide levels are high. Various methods for reducing soot emission have been proposed. Such methods include optimization of combustion chamber shape, controlled injection of fuel, the use of catalytic exhaust gas converters and even modification of the fuel. All have failed to satisfactorily solve the problem. Similarly, methods proposed for control of nitrogen oxides have been similarly ineffective or have resulted in unacceptable losses in fuel economy.

Use of catalysts in engine combustion chambers has previously been proposed by others. For example, Bradstreet et al (U.S. Pat. No. 2,978,860) describe a catalyst based on rare earth oxides suitable for use in the combustion chamber of spark ignition engines. Similarly, Morotski et al (U.S. Pat. No. 3,684,743) teach the use of silico-alumina coatings on the combustion chamber walls of diesel engines and claims improved fuel economy. Note that the Bradstreet coating must not cause ignition of the fuel-air mixture otherwise ignition timing by spark control would not be possible, i.e. pre-ignition or "knocking" would occur. The Morotsky coating is claimed to speed up the decomposition of fuel molecules during the preflame period and prepares th fuel for ignition, thus reducing the quantity of unsaturates in the liquid products of exhaust. Neither patent provides a coating suitable for vaporization and ignition of fuel in a fuel injected engine.

My issued U.S. Pat. Nos. 3,923,011 and 4,011,839 teach the use of catalysts positioned within the cylinders of piston ype engines as does Haslett's patent U.S. Pat. No. 4,092,967. Although emissions and combustion efficiency are thus improved, the presence of a catalyst in the cylinder increases resistance to the flow of gases within the cylinder and thus pumping losses. Further, because catalyst is submerged in the gas flow path, the possibility of catalyst damage is increased.

As disclosed in my prior U.S. Pat. No. 3,928,961, surface reactions alone are far too slow to accomplish reasonably complete combustion in gas turbine systems let alone in internal combustion engines. Although the method of this patent can be used in internal combustion engines as per my two previously cited patents, the method of the present invention is far superior in that intimate admixtures of fuel and air need not be formed for contact with a catalyst. Such admixtures are very difficult to obtain in fuel injected internal combustion engines.

Methods of applying a catalyst to a surface, which are useful in the present invention, are known in the art. Examples are disclosed in Leak patent U.S. Pat. No. 3,362,783, Hindin patent U.S. Pat. No. 3,615,166 and Sergeys patent U.S. Pat. No. 3,903,020. The method of my U.S. Pat. No. 4,341,662 is an especially preferred method.

Methods, useful in the present invention, of applying thermal barrier coatings to the walls of internal combustion engine combustion chambers are also known in the art. For example, the methods disclosed in the U.S. Pat. No. 4,074,671 may be used.

Combustion of fuel in ordinary internal combustion engines is far too slow for maximum efficiency and may even require 40 to 50 crank angle degrees at certain engine speeds or as much as three or more milliseconds. About 20 crank angle degrees is typical for well-designed small engines. If combustion starts after top dead center, combustion will approach the constant pressure mode typical of diesel engines. As noted in the article of Kummer in the February 1975 issue of the MIT Technology Review, p 30, such combustion does not allow full expansion of the burned gases and results in loss of both fuel economy and engine power.

In spite of the fact that the Diesel cycle is considerably less efficient than the Otto cycle, existing Diesel cycle engines, i.e. compression ignition engines as represented by the diesel engine, achieve a significantly higher thermal efficiency than present spark ignition Otto cycle engines because diesel engines operate at higher compression ratios and do not need a throttled air intake. Diesel engines also have lower emissions of carbon monoxide and light hydrocarbons than do commercial spark ignition engines but have high emissions of soot and nitrogen oxides and usually will not burn alcohols as will spark engines.

It should be noted that spark ignition engines typically have a combustion burn time of about three milliseconds. Thus, although spark timing in spark ignition engines permits a closer approach to Otto cycle operation than is possible in diesel engines, combustion still requires about 20 crank angle degrees or more and typically exhibits considerable cycle to cycle variation as is shown in the figure on page 33 of the cited Kummer article. Accordingly, even the spark ignition engine departs appreciably from the Otto cycle requirement of heat addition at constant volume. In fact no conventional engine fully exploits the potential of the Otto cycle or even comes close to achieving theoretical Otto cycle efficiency.

For a compression ignition engine, such as the diesel, placing a catalyst in the line of gas flow, such as in a prechamber or in the main combustion chamber itself, offers only marginal improvement at best since turbulence and thus flame speed is reduced. This is confirmed by the reported results on a Haslett type engine published by Thring, p 133 of Platinum Metal Review, Vol 24 (1980). The need to improve fuel economy and catalyst durability are also noted.

Achievement of the full efficiency theoretically possible from an internal combustion engine requires combustion times nearly an order of magnitude shorter than even those of prior art spark ignition engines and a close approximation to true Otto cycle operation.

DEFINITION OF TERMS

The term "piston means" in the present invention includes not only the pistons of conventional piston engines but also the rotors of rotary engines such as the diesel Wankel and any other equivalent device. The "crown of said piston means" refers to that portion of said piston means which in use forms a wall of a combustion chamber of an internal combustion engine.

For the purpose of this invention, the term "compression ignition engine" means any cyclic combustion engine which operates with periodic injection of fuel into compressed air and in which the heat of compression is sufficiently high in normal operation that combustion occurs on contact of fuel with hot compressed air and-/or with hot combustion chamber walls, an example being the diesel engine. Although the invention is described herein with respect to air as the engine working fluid, it is well understood that oxygen is the required element to support combustion. Where desired, the oxygen content of the working fluid can be varied and the term "air" is used herein to refer to any free oxygen containing working fluid.

In the present invention, the term "true Otto cycle" means a periodic engine cycle in which combustion occurs at constant volume, i.e. the theoretical textbook Otto cycle. The term "Diesel cycle" in the present invention means a periodic engine in which combustion occurs at constant pressure, i.e. the theoretical textbook Diesel cycle.

THE PRESENT INVENTION

I have found that the deficiencies of the ordinary Diesel engine and of the various attempts to improve it with catalysts can be substantially cured and that the limitation of Otto cycle engines to low compression ratios with near stoichiometric fuel-air mixtures and throttled air operation can be eliminated by use of a combustion chamber in a non-spark ignition internal combustion engine in which a sufficient area of oxidation catalyst on the surface of ceramic insulation forms part of the walls of the combustion chamber, typically at least 15% of the combustion chamber wall area as measured with the piston means at top dead center. In operation of the engine, fuel is injected such that at least part of the fuel impinges on the oxidation catalyst surface at about the time of maximum compression. The timed area-wide multiple point chain reaction initiation in the turbulent environment of the combustion chamber causes very rapid and substantially complete combustion which is closer to Otto cycle than Diesel cycle performance. Combustion may even be so close to instantaneous (of the order of 200 microseconds) that the combustion pressure wave approximates true Otto cycle operation. The resulting engine operation is far quieter than that of a Diesel engine with the noticeable absence of the typical Diesel clatter. The engine combustion chambers so constructed, engines incorporating such chambers, and the method of constructing the chambers are also part of my invention.

OBJECTS OF THE INVENTION

It is therefore an object of the present invention to provide a method of operating a catalytic ignition internal combustion engine which facilitates rapid and complete burning of the fuel.

It is also an object of this invention to provide a method of operating such an engine with low emissions of soot and other noxious pollutants.

It is further an object of the invention to provide a method of operating non-spark internal combustion engines in close approximation to the theoretical Otto cycle.

It is another object to provide a method of operating non-spark internal combustion engines using more readily available fuels such as unleaded gasoline, methanol or ethanol.

A further object is to provide combustion chambers suitable for use in the method of this invention.

Still another object is to provide an internal combustion engine of improved thermal efficiency.

Other objects, features and advantages of the present invention will become apparent from the following description and appended claims.

DESCRIPTION OF THE INVENTION

The invention can be further understood with reference to the drawings in which

Figure 1:
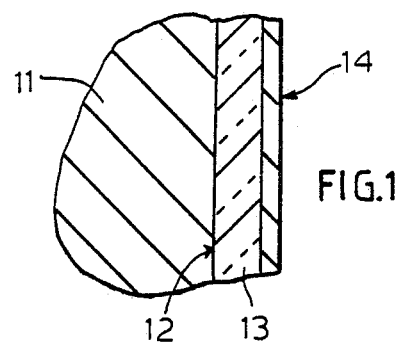
FIG. 1 is an enlarged fragmentary cross-sectional view showing how the catalytic coating is bonded to the thermal insulating coating.

The present invention is further described in connection with the drawings. Conventionally, the inner surface 12 of combustion chamber wall 11 is coated with a thermal insulating coating 13 as seen in FIG. 1. Typically this thermal insulating coating is composed of zirconium oxide with 6% yttrium oxide for stabilization of the crystal structure. According to the invention, a catalytic coating generally indicated at 14 is bonded to the thermal insulating coating. The catalytic coating, which preferably comprises a noble metal catalyst such as platinum chemically bonded to the thermal insulating coating, has the function of facilitating varporization of fuel drops and ignition of vaporized fuel. This section is believed to result from the heat from the oxidation of small amounts of fuel. The thermal insulating coating 13 permits the catalyst to operate at high enough temperature to be effective in this function. The thermal insulating coating 13 must therefore be of sufficient thickness, typically at least about 1 to 10 mils thick. Coatings thicker than 10 mils permit use of less active catalysts but may be subject to thermal shock damage and thus less durable. The vaporization and ignition action of the catalyst results from the combined effects of fuel, air, catalyst and sufficiently high temperatures. The thermal insulating coating 13 allows combustion heat and compression heat during operation of the engine to maintain the catalyst at operational temperatures. Compression of the air raises its temperature and this rise may be sufficient even to start the engine especially if alcohol is the fuel. If needed at initial start-up a conventional electrical glow plug or other heat source may be used to start the engine.

Figure 2:
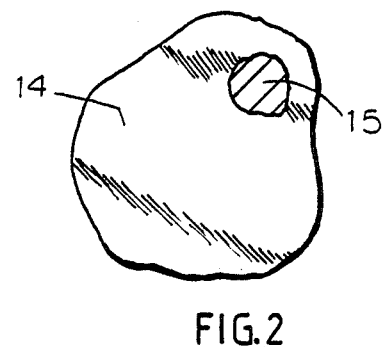
FIG. 2 is a face view of the section of FIG. 1 showing a small uncatalyzed area of the thermal insulating coating.

The catalytic coating is applied over most of the thermal insulating coating 13. To facilitate ignition of fuel vapor under extreme conditions it is advantageous that certain areas 15 of thermal insulating coating or layer 13 be left uncoated as shown in FIG. 2.

Figure 3:
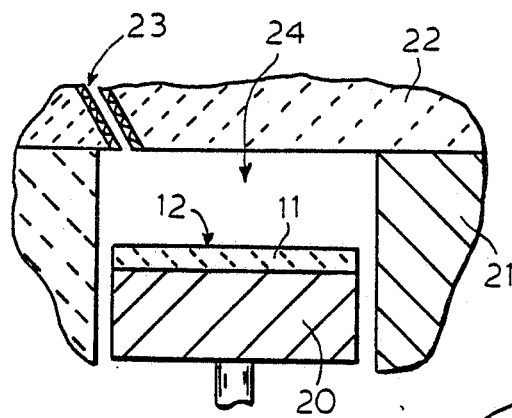
FIG. 3 is a sectional view of a typical arrangement of modified piston in a cylinder of a direction injection catalytic ignition engine.
Figure 5:
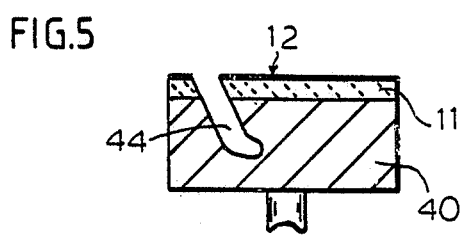
FIG. 5 is a sectional view of an alternate modified piston for use in the engine of FIG. 3.

One preferred embodiment of the invention is the combustion chamber 24 of a direct injection engine generally indicated in FIG. 3. Piston 20 is of composite structure. Combustion chamber wall 11 is in the form of a stainless steel face plate to permit higher catalyst operating temperatures with minimum thickness of thermal insulating coating 13 on the surface 12 facing the interior of combustion chamber 24. The surfaces of cylinder wall 21 are usually uncoated. However, the combustion chamber surfaces of head 22 may have a thermal insulating (thermal barrier) coating and said coating may be coated with catalyst. Fuel injector 23 is positioned such that the fuel spray impinges on the catalyst coating on surface 12. Alternately, piston 40 with air cell 44, shown in FIG. 5, may be used in place of piston 20. As with piston 20, piston 40 is of composite structure with chamber wall 11 in the form of a stainless steel face plate with insulating coating 13 on surface 12. Using piston 40, fuel injector 23 is positioned such that the fuel spray is advantageously directed into air cell 44 and fuel injection terminates prior to the top dead center position of piston 40. Fuel and air are ejected from air cell 44 during the expansion stroke, contacting the catalyst coating on surface 12. This results in exceptionally rapid combustion and is therefore a preferred embodiment for high speed engines.

Figure 4:
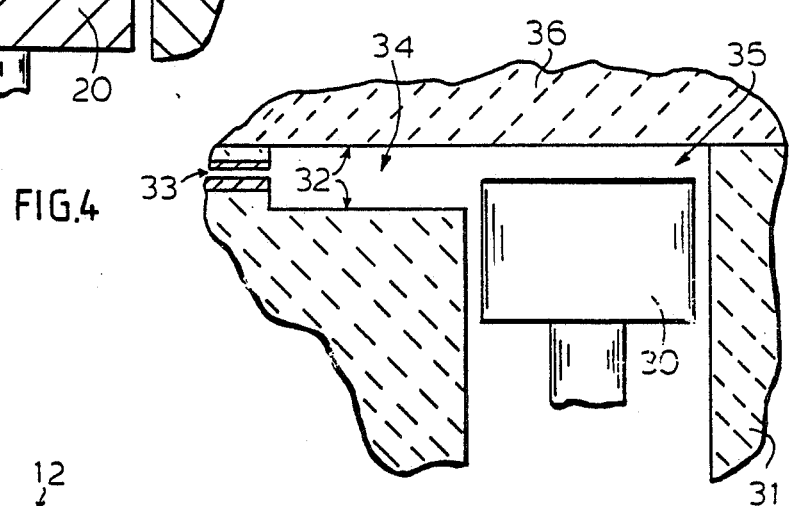
FIG. 4 is a sectional view of a typical arrangement of modified combustion chamber for a prechamber combustion ignition engine.

Another preferred embodiment of the invention is the combustion chamber 34 of the prechamber engine generally indicated in FIG. 4. Piston means 30 operates in the cylinder defined by cylinder wall 31 and at top dead center displaces most of the air in secondary combustion chamber 35 into chamber 34. Head 36 defines one wall of both chambers 34 and 35. Interior surfaces 32 of combustion chamber 34 are coated with a thermal barrier and catalyst as in the case of surface 12 shown in FIGS. 1 and 3. Fuel injector 33 is positioned such that fuel spray impinges on the catalyst coating on surfaces 32.

THE CERAMIC THERMAL INSULATING LAYER

Absolutely essential to the operation of this invention is the presence of a ceramic thermally insulating material as part of the interior combustion chamber walls. Without this insulation underlying the catalytic surface, the latter would cool rapidly between firings and ignition would not be close to instantaneous. Although stabilized zirconia is a preferred material for the thermal barrier layers of this invention, other materials known in the art may be used, including stabilized hafnia, urania, thoria and even alumina or compounds thereof. High melting point materials are required. Catalytic surfaces exposed to the flame in the combustion chamber will reach very high temperatures and thus the insulating material in contact with said catalytic surfaces must have melting points in excess of 3500° F. or even more preferably in excess of 4000° F. The thermal insulating layer should be at least one mil thick to achieve adequate thermal insulation of the catalytic surface. Thicknesses greater than ten mils permit the use of less active catalysts but the insulation can be sensitive to thermal shock damage and such greater thicknesses are not preferred unless thermal shock tolerant ceramic is used. Similarly, the use of all ceramic pistons or other all ceramic components is not presently recommended because suitable tough, thermal shock resistant materials are not now commercially available. Suitable materials, however, are being developed for use in adiabatic engines. With suitable materials, all ceramic combustion chamber walls are preferred for the ceramic thermal insulating layer of this invention. Thermal shock tolerant inserts or liners may also be used.

Inasmuch as present internal combustion engines are typically constructed of metals, the thermal insulation of the present invention has been described in terms of coatings on combustion chamber walls. In the present invention, the term "thermal insulating coating" includes any ceramic surface layer, whether a layer applied by any applicable coating technique or whether the surface layer of a composite ceramic structure. For metal structures, it has been found that flame spraying makes possible thermal insulating coatings as thick as ten or fifteen mils which are remarkably stable under thermal cycling in a combustion environment. At least 15% and more preferably 25% of the combustion chamber walls, i.e. 15% and more preferably 25% of the inner surface of area of said walls as measured with the piston means at top dead center, must be covered with said thermal insulating coating. The coating can be on the crown of a piston means and/or on the walls or the head of the cylinder. Although typical insulating materials are catalytically inactive, such materials can be doped with catalytic substances to render them catalytically active for oxidation of fuels. Thus, the thermal insulating materials of this invention include catalytic materials such as nickel doped stabilized zirconia and the high melting point perovskite oxidation catalysts known in the art. If only the piston crown is to have catalyst, at least 40% of the piston crown should be covered with a ceramic insulating coating on said crown to provide the specified 15% coverage of the combustion chamber walls. Although not required for this invention, complete coverage of all combustion chamber surfaces with ceramic insulation is preferred, since this reduces heat losses. The term "stabilized zirconia of hafnia" includes the partially stabilized materials.

THE CATALYSTS

It is an essential feature of this invention that at least 15% of the combustion chamber walls, as measured with the piston means at top dead center, must be occupied by a catalyst active for the rapid oxidation of fuels on the surface of the thermal insulating layer described herein. Preferably, the catalysts are deposited on the thermal insulating coating and chemically bonded to it. This is advantageous in that the most effective thermal barrier coating can be used irrespective of catalytic properties. Moreover, this permits patterned catalyst coatings with small uncoated areas, preferably less than about 10%, within the catalyst caoted areas. Fuel contacting such uncoated areas promote rapid flame propagation away from the surface and thus contribute to the near instantaneous combustion of the whole. Fuel impinging on catalyst is oxidized providing heat for propagation of flame away from both catalyst coated areas and adjacent uncoated areas.

The catalyst preferably comprises a noble metal such as iridium or platinum, especially the latter. It can, however, comprise nickel or cobalt or other catalytic elements known in the art to be active for fuel oxidation. The catalysts used preferably have a melting point of at least 3000° F. Pervoakite oxidation catalysts of suitable melting point are known in the art may be used. A preferred composition for use in coating stabilized zirconia is as follows:
a. 2 gm platinum metal in the form of chloroplatinic acid
b. 1 gm aluminum nitrate
c. 5 cc zirconyl nitrate solution in water containing about 1.5 gms zirconyl nitrate A method suitable for applying the oxidation catalyst coating of this invention is shown by the following example. The inner surfaces 12 of combustion chamber 24 are previously coated with an yttria stabilized zirconia by conventional flame spraying to a thickness of about 5 mils. The surface to be coated with catalyst is cleaned if necessary by vapor degreasing to assure freedom from dirt, oil or grease. Suitable masks are employed on areas 15 where no catalyst coating is desired.

A catalyst coating is applied comprising chloroplatinic acid, zirconyl nitrate and aluminum nitrate, preferably in aqueous solution taking care not to contaminate the coating. This material may be applied by brushing in one or more light even coats to prevent running. After each coat is applied it is dried in a forced circulation oven at about 200° F. for fifteen minutes at heat and then at approximately 300° F. for thirty minutes.

After the final coat is dried, any mask material is carefully removed and the coated part is cured by heating gradually to 1300° F. and holding at that temperature for one hour.

The catalytic coating, applied as described, has the film of catalytic metal (i.e. platinum) chemically bonded to the thermal barrier layer. With catalytic coatings applied in this manner, it is preferred that the thermal barrier coating be at least 3 mils in thickness. Any thermal barrier material can be coated using various catalyst compositions. For replacement pistons, at least about 40% of the piston crown should preferably be occupied by catalyst on top of thermal insulation to assure that catalyst occupies at least 15% of the combustion chamber surface.

ENGINE COMPRESSION RANGES - FUELS

The minimum compression ratio of engines used in this invention will vary depending on the fuel. Fuels such as methanol and ethanol will operate at compression ratios as low as 10 or 12/1. Methane typically requires ratios above 16/1. Higher than minimum compression ratios promote ease of starting and therefore are advantageous. Further, because the catalyst does not contribute to pumping losses, the maximum thermal efficiency is obtained at compression ratios greater than 14/1.

In the method of this invention an engine is operated in a conventional manner except that fuel is ignited by contact with a hot catalytic surface. Thus, aromatic fuel containing 30 percent or even 50 percent or more aromatic hydrocarbons by weight may be used as well as conventional diesel fuels. Unleaded gasoline and alcohols are especially suitable fuels. In the method of this invention compression ratios in excess of 30/1 are feasible allowing improved fuel economy and ease of starting at subzero ambient temperatures. The preferred compression ratio is most often in the range of 14/1 to 25/1.

An engine of 32/1 compression ratio and of FIG. 3 with a catalyst coating comprising platinum is operated using unleaded gasoline as fuel. Thermal efficiency is high and no soot is visible in the exhaust. The test illustrates surface initiated area wide combustion by contact of a hydrocarbon fuel with a catalyst to approximate true Otto cycle performance from a nonspark internal combustion engine (true Otto cycle performance requires instantaneous combustion before any movement of the piston mean occurs).

In the following tests, the test engine was a Hatz E673 single cylinder air cooled Diesel engine having a compression ratio of 19/1 and a maximum power output of 5 HP at 3600 RPM. The piston has a small air cell in its crown into which fuel is injected prior to the top dead center position of the piston. To monitor cylinder pressure, a Kistler piezoelectric transducer was installed in the cylinder head and connected to an oscilloscope. All tests were run on a single batch of commercial automotive Diesel fuel with the engine connected to a small dynamometer to provide a load for the engine. At 2300 RPM, it was observed that the combustion pressure wave approximated the Diesel cycle constant pressure mode, starting at about top dead center and ending at about 20 crank angle degrees after top dead center for a duration of about 1.5 milliseconds. At 3300 RPM, it was observed that the combustion wave persisted even further into the expansion stroke. During operation, the typical Diesel engine clatter was noted. On disassembly of the engine after the tests, the piston was found to be coated with soot.

In a subsequent test, the same procedure was followed using the same engine but with a different piston which had been modified by attaching to its crown a stainless steel plate with a stabilized zirconia coating of about ten mils with a platinum coating bound thereto (as described elsewhere in these specifications). A matching hole in the plate was aligned with the opening of the air cell in the piston so that the air cell could function as in the tests with the unmodified piston. The piston crown was machined prior to attaching said steel plate so that the dimensions of the piston with plate attached were about the same as those of an unmodified piston. On installing the modified piston, the cylinder head gasket was adjusted to make sure that the clearance between the head and the piston crown was not less than in the previous tests. On operation of the engine at 2500 RPM, using the same batch of fuel as in the previous tests, the combustion pressure wave was observed to closely approximate true Otto cycle performance with a sharp increase in cylinder pressure occurring just after top dead center and in less than about 0.2 milliseconds, i.e. within about three crank angle degrees. At 3300 RPM, a similar Otto cycle type pressure wave was observed. Much less noise was heard during the operation of the engine than in the tests with the standard piston. On disassembly of the engine after the test, the piston was observed to be free of soot.

It should be noted that, fundamentally, combustion time in a Diesel engine is a function of cylinder size and design. The larger cylinders of larger engines typically require increased time for complete combustion and operate at slower speeds than do smaller engines. The Hatz engine used in the above test is quite small and showed combustion times comparable to those of spark engines, yet still exhibited Diesel cycle type combustion as would be retarded spark operation of a spark ignition engine. Still, even in this engine, the use of the catalytic ignition of this invention produced a combustion time roughly an order of magnitude shorter, so short in fact that the combustion pressure wave approximated true Otto cycle operation more closely than even the typical spark ignition engine.

ADVANTAGES OF THE INVENTION

It is an advantage of the method of the present invention that it can be applied to most existing fuel injected compression ignition engine designs. Even most existing diesel engines can readily be modified to operate in accordance with the present invention. This is very important since the future of the automotive diesel engine is being threatened by the diesel's high emissions of soot and by limited availability of diesel fuel.

It is a further advantage of the present invention that it overcomes the limitations of the prior art inventions by providing a catalytic method which provides efficient combustion without the increased pumping losses of in cylinder catalysts or the risks of damage to the engine.

It is a still further advantage of this invention that it permits the use of a wide range of fuels, even those of low cetane number.

It is also an advantage that it is possible to obtain low levels of noxious emissions in combination with exceptional high thermal efficiency.

It is an especial advantage of this invention that it is possible to operate a compression ignition type engine with ignition characteristics more like and in fact superior to those of a spark ignition engine.

I claim:

1. A method of facilitating ignition of fuel injected into compressed air in a cyclic ignition engine combustion chamber at a time near maximum compression solely by contact with a catalyst heated to a temperature high enough to vaporize fuel droplets and ignite vaporized fuel which comprises;

applying a ceramic insulating coating of at least 1 mil thickness having a melting point greater than 3500° F., to at least 15% of the inner surface of said combustion chamber, followed by application of a coating of an oxidation catalyst to said insulating coating , said catalyst being a vaporized fuel ignition catalyst selected from the group consisting of a noble metal, cobalt, nickel and a perovskite catalyst.

2. The method of claim 1 which further includes the step of applying the catalytic coating only on predetermined spaced areas of said insulating coating, whereby the ignited vaporized fuel will be allowed to propagage away from the combustion chamber wall and into the mixture in the combustion chamber.

3. The method of claim 1 in which said catalyst coating comprises platinum.

* * * * *